June 19, 1923. 1,459,269
L. ULLMAN
METHOD OF AND APPARATUS FOR REMOVING AND REPLACING BEARING SLEEVES
OF PROPELLER SHAFTS
Filed Dec. 1, 1921 2 Sheets-Sheet 2
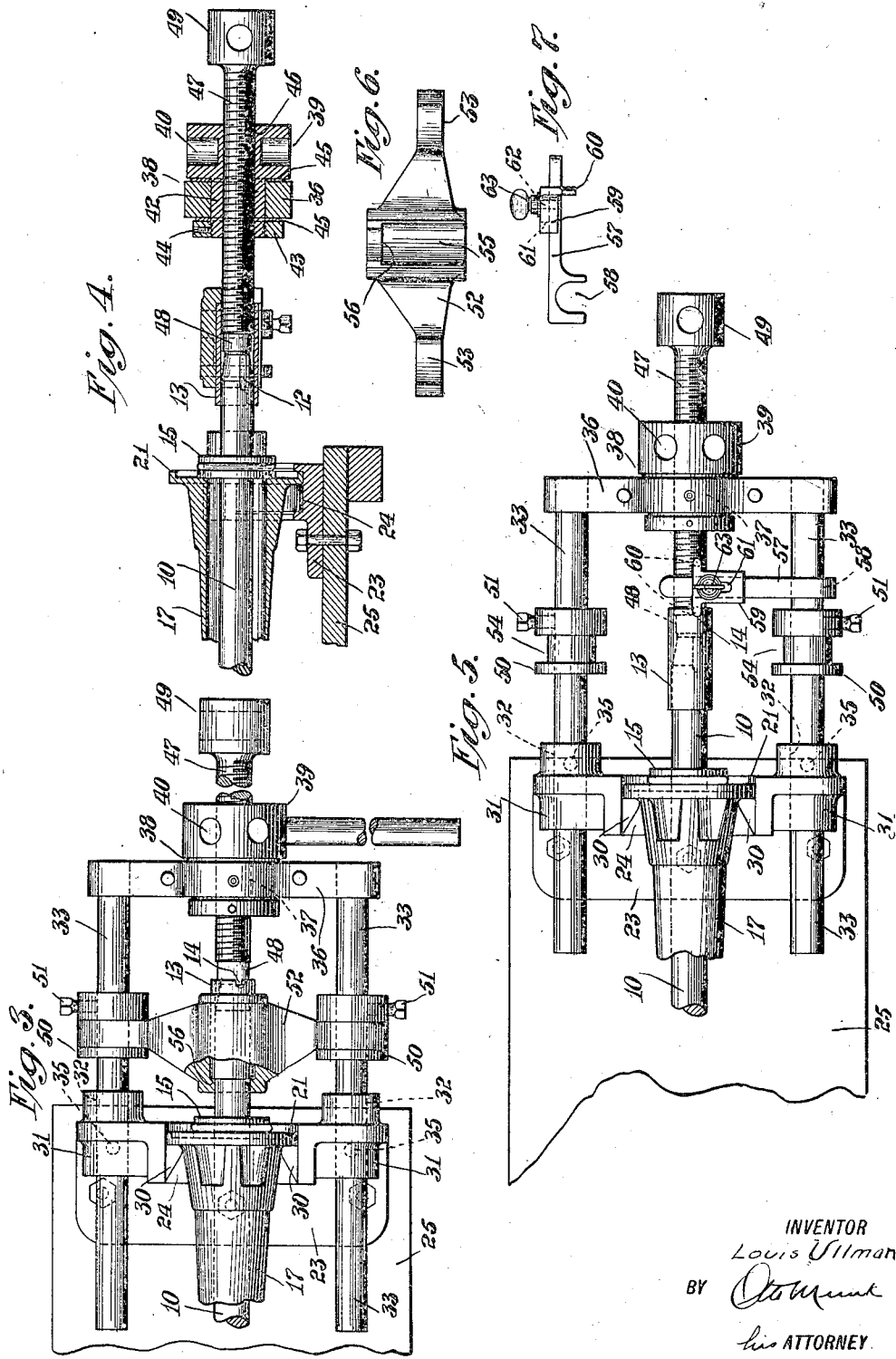
INVENTOR
Louis Ullman
BY
his ATTORNEY Patented June 19, 1923.

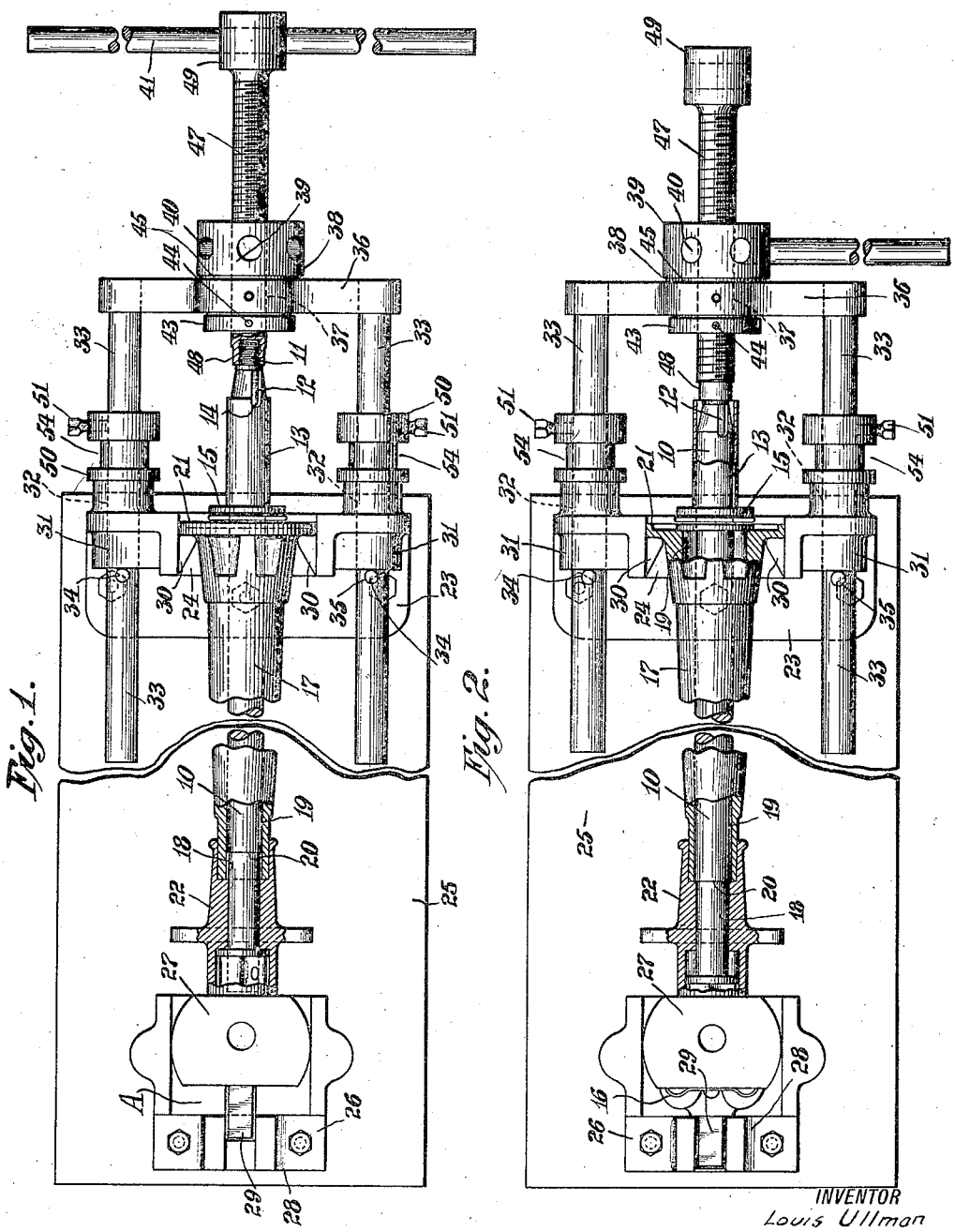

1,459,269

UNITED STATES PATENT OFFICE.

LOUIS ULLMAN, OF NEW YORK, N. Y.

METHOD OF AND APPARATUS FOR REMOVING AND REPLACING BEARING SLEEVES OF PROPELLER SHAFTS.

Application filed December 1, 1921. Serial No. 519,039.

*To all whom it may concern:*

Be it known that I, LOUIS ULLMAN, a citizen of the United States of America, residing at New York city, in the county of New York and State of New York, have invented certain new and useful Improvements in a Method of and Apparatus for Removing and Replacing Bearing Sleeves of Propeller Shafts, of which the following is a specification.

My invention relates generally to an improved method of and apparatus for removing and replacing the rear bearing sleeve of a Ford propeller shaft. The apparatus comprehends a mechanism which may be operated to first move the propeller shaft axially and inwardly with respect to the bearing sleeve and to its torque tube casing; a tool adapted to be applied to said mechanism to subsequently move the bearing sleeve outwardly or inwardly and relatively to the shaft itself; and finally a gauge attachably supported in said mechanism and adjustably operated to predetermine the proper relative position of the bearing sleeve with respect to the propeller shaft prior to reversing the movement and position of the tool to reset the said sleeve in its initial position upon the shaft.

The method consists in a novel manner of manipulating the several parts of the structure to effect the removal and replacement of the bearing sleeve.

In the Ford type of torque tube casing used to house the propeller shaft there is no space between the flange at the rear end of the tube and the adjacent edge of the bearing sleeve, which is carried by the protruding portion of the shaft, except such space as may be needed to accommodate a thrust bearing. For the purpose of freeing the connection between the sleeve and the shaft various kinds of tools have been proposed, designed mainly to engage the sleeve between the thrust bearing and the edge of the sleeve itself, but obviously any tool which is keen enough to be introduced between the edge of the sleeve and the bearing is altogether too frail to be capable of exerting any effective pressure against the sleeve in the operation of moving the latter relatively to the shaft.

Hence, the present practice is for mechanics to remove the sleeve before proceeding with their repair work by breaking the steel shell with a blow from a hammer or other similar instrument upon the surface of the shell, which is very brittle and is readily broken. It has also been suggested to grip the outer surface of the sleeve in an effort to draw the latter from the end of the shaft, but the very nature of the hardened steel shell is such as to resist any gripping action of a tool designed for this purpose.

The setting of the bearing sleeve upon the propeller shaft results in providing an extremely tight fit between the two members, because the bore of the sleeve being almost of the same diameter as the shaft the sleeve is driven over the shaft under considerable pressure and an almost inseparable union takes place between the two elements. The first step in the method of removing the sleeve from the shaft is to free this connection and one object of the invention is to provide suitable mechanism by which the shaft may be moved a slight distance with respect to the bearing sleeve without in any way impairing the latter for future use.

With the sleeve moved relatively to the shaft and a space provided between the face of the torque tube flange and the edge of the bearing sleeve, a subsequent step in the method of removing the sleeve from the shaft, consists in engaging the forward edge of this sleeve and moving such sleeve with respect to the shaft, and a further object of the invention is to provide efficiently operating means for carrying out this step of the method.

A still further object of the invention is to provide a gauge tool which may be adjusted to predetermine the relative position of the sleeve with respect to the shaft prior to replacing the former to its initial position.

The invention is illustratively exemplified in the accompanying drawings, wherein—

Fig. 1, is a plan view of the mechanism for removing the sleeve from the propeller shaft, and illustrates the first step in the operation of the invention. Parts of the torque tube are shown broken away to clearly illustrate the takeup space adjacent the forward end of the propeller shaft and between the shoulder of the latter and the end of the torque tube.

Fig. 2 is a plan view of the device similar to Figure 1, but with the shaft in the position it assumes after it has been driven partially through the tube or sleeve. This figure illustrates the second step in the present method.

Fig. 3, is a fragmentary view of the invention illustrating the third step in the operation of the device and showing the engaging tool completing its final movement of drawing the bearing sleeve from the propeller shaft.

Fig. 4, is a substantially longitudinal sectional view of the torque tube casing and screw spindle supporting mechanism, showing the engaging tool reversed to replace the sleeve over the shaft.

Fig. 5, is a plan view of the device with the gauge for determining the relative position of the sleeve with respect to the shaft before driving the former over the shaft to its initial position.

Fig. 6, is a bottom plan view of the sleeve engaging tool showing the position of the shoulder which is adapted to be moved against either edge of the bearing sleeve.

Fig. 7, is a side elevational view of the gauge tool.

Referring to the drawings, 10 denotes the standard propeller shaft of the Ford type having its rearwardly extending end portion tapered slightly and terminating in a threaded stem 11 adapted to receive a locknut which holds the bevel driving pinion (not shown) on the shaft 10. Cut in the surface of the tapered portion of the shaft 10 and extending forward slightly beyond the taper is a keyway 12, into which a key (not shown) is driven and with which the keyway of the bevel driving pinion is brought into register. Driven over the propeller shaft 10 and extending forwardly from the base of the tapered portion is a bearing sleeve 13 having a slot 14 in its rear edge adapted to register with the keyway 12. Mounted on the shaft 10 and operating against the opposite or forward edge of the sleeve 13 is a thrust bearing 15 comprising the usual parallel rings separated from each other by balls.

Power is transmitted from the transmission through the universal joint 16 to the shaft 10, which is enclosed in a torque tube 17, and which is adjacent its end opposite the sleeve 13 reduced in diameter as at 18. The torque tube 17 has a longitudinal bore 19, to receive the propeller shaft 10, the latter being tapered from a point slightly rearwardly of the shoulder 20, at the end of the reduced portion 18, towards the opposite end of the tube, at which end the latter is provided with a flange 21. The face of this flange 21 is adapted to receive the forward face of the thrust bearing 15, which is held in operative position by the sleeve 13. The forward end of the torque tube 17 extends slightly beyond the shoulder 20 and is embraced by a tubular extension 22 of the universal-joint-casing 27 having a bore of a diameter to loosely receive the reduced portion 18 of the shaft 10. It will be noted that, as a result of this construction a space is provided between the shoulder 20 and the adjacent end of the torque tube 17, and it is within this space that, in accordance with the present invention, I contemplate moving the shoulder 20 and shaft 10 until the former engages the inner end of the extension 22, such a movement being effected to bring the tapered end of the shaft 10 within the sleeve 13, as shown in Figure 2.

Referring now to the mechanism for holding the torque tube 17 at its opposite ends against longitudinal movement to free the connection between the sleeve and the shaft, 23 denotes an upright solid metal standard having an open ended vertical slot 24 into which the flange 21 is adapted to seat. This standard may be attached to a work bench or platform, in the present instance a straight base plate being shown. A second standard 26 is mounted on the base plate 25 at the opposite end thereof and is in proper position to support the globular portion 27 of the extension 22 which houses the universal joint 16. The standard 26 comprises a substantially U shaped member, the lateral walls of which are parallel with the axis of the torque tube 17 and which embrace the globular portion 27 of the extension 22. Carried by the horizontal portion of the standard 26 transversely of its axis is an inverted T shaped member 28 having its central stem forked to receive the square shaft 29 of the universal joint 16. The width of the lateral walls of the standard 26 is substantially greater than the length of the globular portion 27 and this difference between the width of the standard walls and that of the housing 27 is the same as the distance between the shoulder 20 and the end of the torque tube 17, i. e. when the shaft 10 is in operative position. Therefore, with the universal joint 16 housed completely within the globular portion 27 and the square shaft 29 projecting forwardly and into the fork of the member 28, there will be a space, indicated at A in Figure 1, between the edge of the universal joint 16 and the opposite face of the member 29, and it is in this space A that the universal joint may be moved to permit the first step in the operation of removing the sleeve 13 from the shaft 10.

The mechanism for removing the sleeve 13 from the shaft 10 is carried by the rear standard 23 in which the flange portion 21 of the torque tube 17 is supported. In addition to providing a suitable support for the end of the tube 17, the opposite walls of the standard 23 are provided with integral inwardly projecting lugs 30 which abut the forward face of the flange 21, as clearly shown in Figure 1, and which prevent axial movement of the torque tube 17 when the latter is subjected to forward pressure during the first step in the operation of freeing the engagement between the sleeve 13 and the shaft 10. Projecting outwardly from the opposite sides of the upright walls are the bearing ears 31 provided with parallel bores 32 adapted to receive a pair of slidable bars 33, the axes of which are substantially on the same plane as the axis of the torque tube 17. In Figure 1, the bars 33 are shown held in their extreme forward position by means of stop pins 34, which may be received in transverse openings drilled in the bars 33, and which engage with the adjacent walls or faces of the ears 31. The rearwardly projecting portions of the bars 33, extend somewhat beyond the possible limit of movement of the threaded stem 11 of the shaft 10, and are fixed to a cross head 36 comprising a heavy steel plate provided with a central opening 37, which is axially aligned with the torque tube 17, and which forms a bearing for a turn screw 38.

The particular construction of the turn screw 38 is clearly shown in Figure 4, in which the parts appear in section. The turn screw comprises an annular winch 39 having a series of radially disposed deep openings 40, which are adapted to receive the end of a handle 41 and a bearing collar 42 loosely traversing the central opening 37 of the cross head 36. The forward end of the collar 42 projects substantially beyond the face of the cross head to receive a locking disc 43, fixed to the collar by a set screw 44. Bearing rings 45 are interposed between the opposite faces of the cross head 36 and the winch and disc. The winch is provided with a threaded bore 46 axially aligned with the rear end of the shaft 10. Operable in the bore 46 is a threaded spindle 47, constructed at its forward end to receive the threaded stem 11 of the shaft 10. In Figure 1, it will be noted that the end of the spindle is drilled and tapped at 48 and by suitable rotation of the spindle the threads 48 of the latter will ride over the stem 11 until the end of the spindle engages with the shoulder defining the end of the tapered portion of the shaft 10. The opposite end of the spindle is provided with an enlarged head portion 49 having a transverse opening therein to receive the handle 41, as shown in Figure 1.

To remove the sleeve 13 entirely from the end of the shaft 10, (Figure 2) which is done after axial movement of the shaft 10 through the sleeve, it is necessary to remove the stop pins 34, whereupon the cross head 36 may be drawn rearwardly away from the standard 23, and the spindle 47 and shaft 10 being connected thereto will also be moved rearwardly until the universal joint is again in its initial position. The extent of this relative movement between the shaft 10 and the torque tube 17 is equal to the distance the shoulder 20 is permitted to travel before being brought into engagement with the extension 22, and with the space 18 occupied after the shaft has been moved this amount, it is simply necessary in order to provide an equal space at the face of the flange 21 between the latter and the forward end of the sleeve, to draw the carriage comprising the rods or bars 33 and cross head 36 outwardly away from the torque tube 17. With the several parts in the position just described, a suitable tool may be applied to the forward edge of the sleeve to cause further relative movement between the sleeve and shaft to force the former over the latter.

In order, that the operation of entirely removing the bearing sleeve 13 from the end of the shaft 10 may be completed I mount a collar 50 upon each of the bars 33 between the ears 31 and the forward face of the cross head 36 and by fixing them to the bars by set screws 51, a specially designed tool may be supported and operated by movement of the carriage in a direction away from the shaft, which at this point in the operation has been moved rearwardly its maximum amount. This tool is particularly shown in Figures 3, 4, and 6, and comprises a yoke member 52 having forked outer ends 53 adapted to seat in annular grooves 54 of the collars 50; the central portion of the yoke 52 is substantially longer than the forked ends 53 and is provided with a channel 55 open beneath the yoke and adapted to rest over the partially removed sleeve 13. The channel 55 extends from one end of the yoke to a point short of the opposite end thereof to provide a semi-circular shoulder 56. The width of the shoulder 56 is equal to the distance the shoulder 20 permits the shaft 10 to be moved during the first step in the operation of the invention. With this construction it will be obvious that after the sleeve 13 has been forced away from the flange 21 the shoulder 56 may be introduced into the intervening space and the forked ends 53 seated in the grooves 54.

After the sleeve 13 has been removed from the shaft 10 and it is desired to return it to the operative position, the proper positioning of the sleeve 13 with respect to the shaft 10 is essential, so that the slot 14 will exactly register with the keyway 12. The present invention contemplates the use of a specially designed gauge tool, shown in Figures 5 and 7, which is adjustable within certain limits, and which may be set to properly gauge the slot 14, before the sleeve is driven to its initial position on the shaft, to register with the keyway 12. The gauge comprises a straight metal bar 57 provided at one end with a downwardly projecting forked portion 58, the tines or branches of which are adapted to span one of the carriage bars 33. Slidably mounted on the other end of the bar 57 is an adjustable gauge 59 having a pair of transversely disposed and downwardly projecting fingers 60 adapted to be brought into register with the keyway 12. The body portion of the gauge 59 is provided with a slot 61 through which the stem of the set screw 62, mounted in a threaded opening in the bar 57, is projected, the said screw 62 being provided at its upper end with a butterfly head and washer 63.

The operation of the invention by which the bearing sleeve is removed from the propeller shaft will now be described, the sequence of steps constituting one complete operation from the time the torque tube is placed in the device until the sleeve has been removed and returned to its initial position upon the shaft.

The method which will be described first, consists in holding the torque tube 17 against possible movement in any direction, thereafter moving the propeller shaft 10, provided with the bearing sleeve 13, with respect to the latter, a predetermined distance, then moving the shaft 10 and sleeve 13 together away from the torque tube 17 a distance equal to the initial axial movement of the shaft 10, said last named operation being effected to provide a space between the end of the torque tube and the adjacent edge of the bearing sleeve 13, and thereafter engaging the latter through the said space and moving it axially with respect to the shaft itself, to completely disengage the sleeve 13 from the shaft 10. To reset the bearing sleeve 13 about the propeller shaft 10, as a subsequent step in the carrying out of the present method, the sleeve is first adjusted about the shaft 10 to predetermine the proper relative position of the bearing sleeve 13 with respect to the fixed position of the shaft itself, and then, to complete the final operation, the sleeve is engaged at its edge, opposite that which was first engaged to withdraw the member, and moved axially of itself and of the shaft towards the opposite end of the latter and adjacent the end of the torque tube 17.

The operation of the device for carrying out the above described method is as follows: Assuming the torque tube 17 and propeller shaft 10 to be supported between the upright walls of the standards 23 and 26, as shown in Figure 1, i. e. with the square shaft 29 seated in the forked portion of the member 28 to insure against rotary movement of the shaft 10 during operation of the invention, and with the flange 21 of the opposite end of the torque tube engaged by the lugs 30 of the rear standard 23, to prevent possible forward movement of the torque tube itself, the first step in the operation will be to insert the handle 41 into the opening in the head portion 49 of the threaded spindle 47 and by turning the handle rotate the spindle to advance it through the turnscrew 38. By aligning the threaded end 11 of the shaft 10 with the axis of the spindle 47 and continuing to rotate the latter until the threads 48 engage those on the stem 11, the spindle 47 will ultimately seat against the shoulder at the end of the stem 11. At this point in the operation the shaft 10 becomes virtually an integral part of the spindle 47 and any further movement of this shaft must be effected through movement of the spindle 47.

The handle 41 is then withdrawn from the head 49, one of its ends inserted into the openings 40 in the winch 39, and thereafter the handle is rotated towards the left about the axis of the spindle 47. Such movement will tend to force the spindle 47 and shaft 10 toward the front end of the torque tube and cause the stop pins 34 to be drawn against the adjacent face of the ears 31 of the standard 23, a movement which is opposite in direction to the general travel of the spindle 47 and shaft 10. With the carriage thus held against further movement, the entire weight of the advancing spindle 47 and shaft 10 is brought to bear against the bearing sleeve 13, which, as previously stated, is seated against a thrust bearing 15, the latter being backed by the flange 21 of the torque tube 17. Therefore, the entire leverage power of the rotating spindle, which is very great, is applied in the action of breaking the engagement between the shaft 10 and the sleeve 13. The winch 39 is continuously rotated until the shaft 10 has traveled a sufficient distance to bring the shoulder 20 into engagement with the face of the extension 22, as shown in Figure 2. It may be stated that the possible relative movement between the shaft 10 and torque tube 17 is approximately three quarters of an inch.

As a subsequent step in the operation being described, the stop pins 34 are withdrawn from the bars 33 and the entire carriage is retracted from the face of the flange 21 and standard 23. Such movement which is limited to three quarters of an inch, i. e. the distance between the shoulder 20 and the end of the torque tube 17, returns only the shaft 10 to its initial position, and will move the bearing sleeve 13 to a point with its front edge in advance of the thrust bearing 15 substantially three quarters of an inch. It is into the space between the edge of the sleeve 13 and the bearing 15 that the shoulder 56 of the central portion 55 of the yoke member 52 is adapted to be placed, while the forked outer ends 53 are engaged in the grooves 54 of the collars 50 which are carried by the carriage. With the sleeve 13 engaged at its forward edge, the winch 39 is rotated towards the left, whereupon the shaft 10 will again travel forward until the shoulder 20 engages the extension 22 and is prevented from further movement. Assuming that the shaft 10 has reached its maximum travel, it will be noted that during this operation the carriage remained stationary, as did likewise the yoke member 52 with the sleeve 13, and assuming further that the winch 39 has been continuously rotated, there will be rearward movement or travel of the carriage, which will draw the sleeve 13, through the engagement of the yoke member 52 with the former, free from the shaft 10. It is now a simple matter to release the end of the shaft 10 from the spindle 47, whereupon the torque tube 17 and shaft 10 may be removed from the standards. It will be noted that with the operation just described, the sleeve 13 may be removed from the shaft 10 without in any way impairing either member for future use.

To replace the sleeve 13 a single step is necessary and may be carried out with the same apparatus employed to remove it. The replacing operation is as follows: The sleeve 13 is first placed over the free end of the spindle 47 and the torque tube 17 again placed in proper position in the standards 23 and 26, i. e. resetting the spindle 47 about the end portion 11 of the shaft 10 to axially support the latter in a manner similar to that employed at the beginning of the operation. The downwardly projecting legs 60 of the adjustable portion 59 of the gauge tool are moved into register with the keyway 12, the opposite forked end 58 being supported over one of the bars 33, as shown in Figure 5. The gauge thus set is moved along the bar 33 to a point adjacent the rear edge of the loose sleeve 13 and the latter is rotated and moved axially until the slot 14 therein is brought into register with the adjacent leg 60. This done the slot 14 and keyway 12 should be in substantially axial alignment with each other.

The gauge is then removed and the yoke member 52 placed upon the bars 33 in a position which is reversed from its arrangement when the sleeve 13 was being removed, and which will bring the shoulder 56 into engagement with the rear edge of the sleeve 13, as illustrated in Figure 4. The winch 39 may then be rotated towards the right or in a direction opposite to the initial movement employed in the first operation of removing the sleeve, and the shaft 10 and spindle 47 will be compelled to travel rearwardly to their initial positions and thereafter force the carriage to travel towards the standard 23, in which case the sleeve moves over the end of the shaft 10 until properly brought into engagement with the thrust bearing 15. It will be noted that with this operation completed the slot 14 will be directly over the keyway 12, so that the key of the bevel pinion drive may be received therein, and the torque tube with its shaft 10 is ready to be attached to the differential housing.

Having thus described the invention, which is claimed and desired to be secured by Letters Patent is:—

1. The herein described method of freeing a bearing sleeve and a propeller shaft encased in a torque tube of the Ford type, which method consists in driving the shaft through a space between the shaft and tube, the movement of said shaft being relative to the sleeve and torque tube.

2. The herein described method of removing the rear bearing sleeve from the propeller shaft encased in a torque tube of the Ford type, which method consists in driving the shaft through a space between the said shaft and the torque tube the entire length of said space, such movement being effected relatively to said sleeve and the torque tube, and thereafter moving the sleeve in a direction opposite to the initial movement of the shaft and with respect to the latter and said tube.

3. The herein described method of removing the rear bearing sleeve from the propeller shaft encased in a torque tube of the Ford type, which method consists in driving the shaft through a space between the shaft and the torque tube to move the former relatively to the latter and the sleeve a distance equal to said space, thereafter moving the shaft and sleeve with respect to the torque tube to provide a similar space between the end of the said tube and the adjacent edge of the sleeve, and then moving the sleeve away from the torque tube and relatively to said shaft.

4. An apparatus of the character described, comprising means for freeing a bearing sleeve and a propeller shaft encased in a torque tube of the Ford type, the said means including a tube supporting device provided with means for embracing the square end of the said propeller shaft to prevent rotary movement thereof.

5. An apparatus for freeing a bearing sleeve and a propeller shaft encased in a torque tube of the Ford type, said apparatus including a supporting device for said torque tube, the said supporting device being provided with means for embracing the square end of the propeller shaft to prevent rotary movement thereof, and means movable relatively to said supporting device and engaging said shaft to move the latter axially with respect to the torque tube and said sleeve.

6. An apparatus of the character described, comprising supporting devices for the opposite ends of a torque tube encasing a propeller shaft with a bearing sleeve at one end thereof, means movable relatively to said supporting devices and adapted to engage said shaft to drive the latter through a space between the torque tube and the shaft and relatively to the bearing sleeve, and a carriage movably supported in a supporting device and in which said means is mounted.

7. In an apparatus of the character described, the combination with a supporting standard having means for holding the end of a torque tube against movement, said standard being provided with oppositely disposed guideways of a carriage slidably mounted in said guideways, said carriage comprising a rotatable winch having a threaded bore, and a screw spindle operable in said bore and adapted to be first moved axially and independently of said carriage to engage the end of a propeller shaft encased in said torque tube and then moved axially with the carriage a distance equal to the initial movement imparted to the shaft to provide a space between the torque tube and the adjacent edge of said sleeve.

8. In an apparatus of the character described, the combination with an axially and rotatably mounted spindle adapted to integrally engage the end of a propeller shaft encased in a torque tube of the Ford type to drive the shaft through a space between the tube and the shaft, of a carriage having a winch loosely mounted therein provided with a threaded bore to receive said spindle, and means removably connected to said carriage and adapted to engage the edge of a bearing sleeve mounted on said shaft, whereby rotary movement of said winch will cause the carriage to move axially of said spindle and relatively of the torque tube and shaft to draw the said sleeve over the shaft.

9. In an apparatus of the character described, the combination of a carriage having projecting members provided with transverse openings therein, pins insertible in said openings to prevent relative movement of the carriage with respect to said apparatus, a cross head connected at its opposite ends to the ends of the projecting members, a winch loosely mounted in said cross head and provided with a threaded bore extending axially of said members, a rotatably and axially movable spindle mounted in said bore and provided with a threaded bore in one end adapted to receive the threaded end of a propeller shaft, grooved members secured to each of said projecting members in said carriage, and a yoke insertible at its opposite ends in said grooved members and having an open channel provided with means for engaging the edge of a bearing sleeve mounted on the shaft to move the former relatively of the latter during rotary and axial movement of said winch relative to the said spindle.

10. In an axially movable carriage of the character described, the combination of a yoke member removably supported in said carriage and comprising a pair of downwardly projecting forked ends insertible in said carriage, and a centrally disposed channel portion having its lower wall open to rest over the bearing sleeve subsequent to a partial relative movement of the latter with respect to a propeller shaft encased in a torque tube of the Ford type, said channel being provided with a marginal shoulder adapted to engage the edge of said sleeve to further move the latter relatively to the shaft.

11. In an apparatus for removing the bearing sleeve from a propeller shaft encased in a torque tube of the Ford type, the combination with supporting standards for opposite ends of the tube, means for first moving the shaft in one direction through a space between the tube and the shaft, means movable relatively of said first named means to entirely free the sleeve from the shaft, and a gauge supported at one end in said second named means and adapted to predetermine the relative position of the sleeve with respect to the shaft prior to replacing the sleeve in its initial position about the shaft by the reverse operation of said second named means.

12. In combination with a carriage for moving the bearing sleeve of a propeller shaft encased in a torque tube of the Ford type, of a gauge therefor having one end forked to engage said carriage, and an adjustable gauge member carried by the gauge proper and comprising a projecting portion adapted to be set to first register with a keyway in said shaft and then to receive a slot in the wall of said sleeve, whereby axial movement of the latter relative to the axis of the shaft will bring the slot into register with the keyway.

13. An apparatus of the character described and claimed in claim 6, in which the supporting device for the tube comprises a supporting standard having projecting lugs adapted to be disposed in the path of axial movement of the flanged portion of a torque tube of the Ford type.

14. The herein described method of separating a propeller shaft and bearing sleeve encased in a torque tube of the Ford type, which consists in applying end pressure to the shaft with the sleeve and tube held against movement to partially release engagement between the sleeve and shaft, thereafter moving both the shaft and sleeve relatively to the tube until a space is left between adjacent ends of the sleeve and tube, and finally again applying end pressure to the shaft with the sleeve held against movement to completely release the engagement between the shaft and sleeve.

In testimony whereof I affix my signature.

LOUIS ULLMAN.